3,492,755
TROLLING LURE
Eric L. Sundblad, Rte. 2, Box 108,
Anacortes, Wash. 98221
Filed Mar. 8, 1968, Ser. No. 711,737
Int. Cl. A01k 85/04
U.S. Cl. 43—42.16　　　　　　　　　　　　　9 Claims

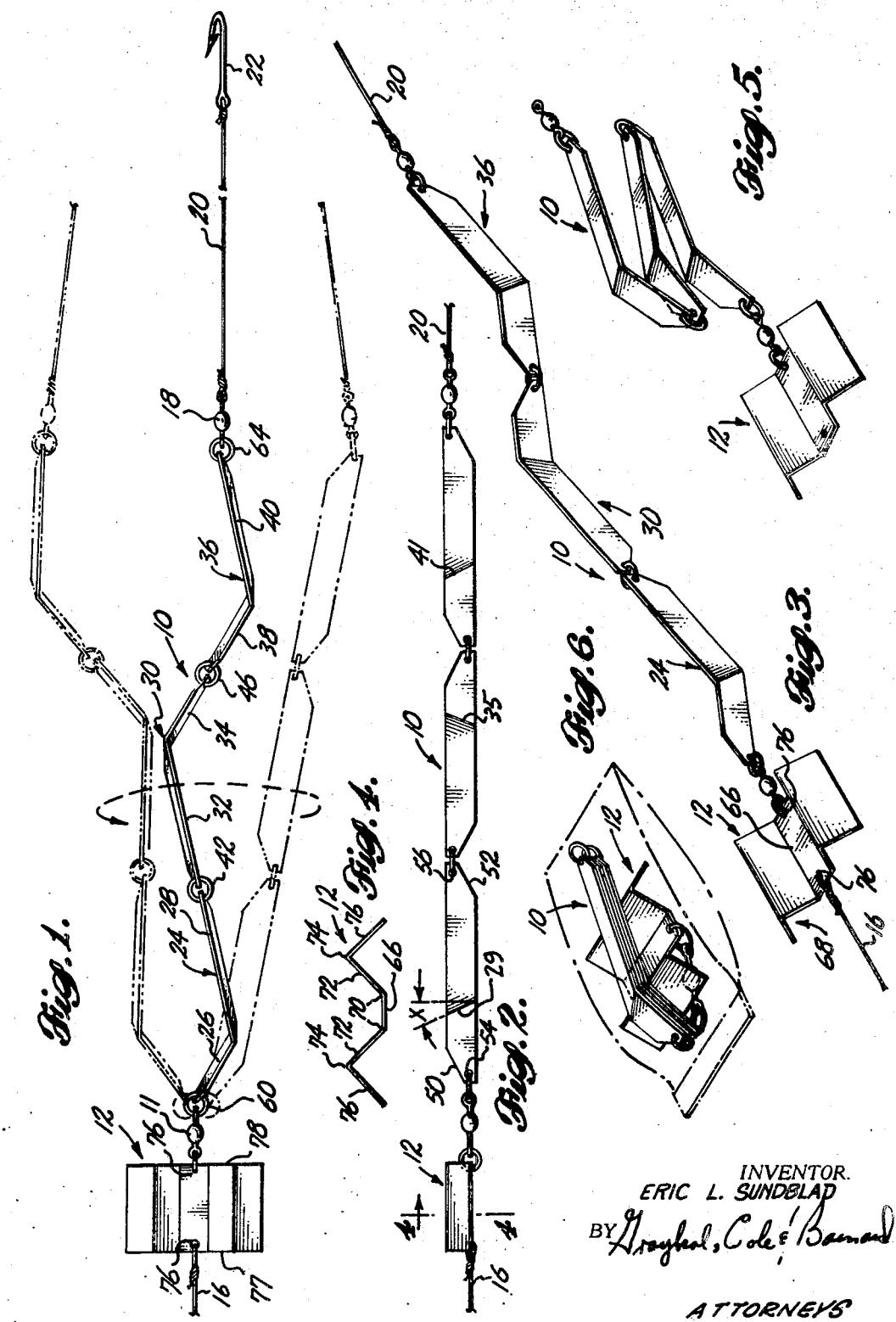

ABSTRACT OF THE DISCLOSURE

Identical generally rectangular forward, intermediate and rear sheet material strips of embossed aluminum colored an opposite sides with a contrasting color. Each strip having first and second dihedrally related end portions meeting together along an apex line that extends diagonally across said strip at an acute angle to the transverse centerline of the strip. The first end portion of each strip is shorter than the second end portion and like end portions of adjoining strips are connected by split ring connectors. Swivel connectors join the rear strip to a leader and the forward strip to a rudder. The rudder has a flat central portion integrally joined to V-shaped side portions. When not in use the strips are folded within each other with the innermost strip resting against the apexes of the V-shaped portions of the rudder to form a compact package.

BACKGROUND OF THE INVENTION

Field of the invention

This invention pertains to fishing lures and particularly to multiple strip trolling lures that simulate the movement of a fish when in use.

Description of the prior art

Normally a lure of this type is secured to a fish line through a swivel connector and rudder and at its other end to the leader which holds the hook and bait. The fish are attracted to the lure, which acts as a flasher, and thence to the bait.

Various lures have been used heretofore with varying degrees of success. Each has produced a particular motion which is intended to simulate the motion of a fish. Examples of such lures may be found in the patents to Stackhouse 3,056,228 and Bunce 2,805,512.

SUMMARY OF THE INVENTION

This invention is also directed to a lure that produces a motion closely simulating the movement of a fish. One of its primary features is to produce a motion of slow rotation or roll with simultaneous wiggling. This is accomplished by employing a plurality of sheet material members each bent to produce a particular rolling motion and then joining them with roll motion transferring connector means to produce a compound motion of slow rotation and wiggling.

A second feature is that the lure is made to more closely simulate an actual fish by applying contrasting colors to the opposite sides of the sheet material members. Thus when the lure is slowly rotating and wiggling it produces the illusion of a somewhat conical body with contrasting flashing colors.

Another feature is the unique design of a rudder, normally employed to isolate the rotation of the lure from the fishing line, which rides through the water in a horizontal plane. The rudder's unique construction is less susceptible to drag and rotation over a wide range of trolling speeds. The rudder employs a flat central portion integrally connected with lateral side portions of channel form.

Still a further feature of the invention is that the elongated sheet material members are so shaped that they may be placed against the rudder to form a compact and attractive package greatly enhancing the marketability of the lure.

BRIEF DESCRIPTION OF THE DRAWING

FIG. 1 is a plan view of a lure and rudder embodying the invention.

FIG. 2 is a side elevational view of the lure and rudder shown in FIG. 1.

FIG. 3 is an isometric view of the lure and rudder.

FIG. 4 is a section through the rudder taken along the line 4—4 of FIG. 2.

FIG. 5 is an operational view showing the individual strips of the lure being folded into a compact package.

FIG. 6 is an isometric view of the completed package.

DESCRIPTION OF THE PREFERRED EMBODIMENT

With reference to FIG. 1, the lure, identified by the general reference character 10, comprises three identical elongated forward, intermediate and rear strips or sheet material members. The strips are preferably of embossed aluminum and each side is of a contasting color. Other materials, such as plastic, chrome plated metals or the like may also be used and the color pattern may vary as desired. For example, the sides of all the strips facing the same direction may be of one color, and their opposite sides of a contrasting color. The lure is joined at one end by a forward conventional swivel 11 to a rudder 12 which in turn is joined to the fishing line 16. The lure at its other end is joined through a rear conventional swivel 18 to a leader 20 having a hook or plurality of hooks 22. The leader and hooks are conventional and form no part of the lure. Preferably they are added by the fisherman at the fishing site. The purpose of the rudder is to isolate the rotational movement of the lure from the fishing line to prevent tiwsting of the line.

The strips are identified in the drawing as a forward strip 24 having a first end portion 26 and a second end portion 28. The first and second end portions are generally planar and are dihedrally related to each other at an angle of about 130 degrees so as to meet along an apex or fold line 29. The apex line is at an acuate angle preferably about 30 degrees, with respect to the transverse centerline of the strip. An intermediate strip 30, identical to the forward strip, also includes a second end portion 32 and a first end portion 34. The first and second end portions of the intermediate strip are dihedrally related to each other and similarly meet along an apex or fold line 35. Finally, although more or less strips may be employed, a rear strip 36, identical with the preceding strips, includes a first end portion 38 and a second end portion 40. The first and second end portions are dihedrally related to each other so as to meet along an apex or fold line 41. In each of the foregoing strips the first end portion is shorter than the second end portion preferably about one-half the length of the second end portion.

The strips 24, 30, and 36 are joined with their like ends together by roll motion transferring connector means, such as a split ring connector 42, which connects the second end portions 28 and 32 of the forward and intermediate strips, respectively. A split ring connector 46 connects the first end portions 38 and 34 of the intermediate and rear strips, respectively. As is readily seen the split ring connectors are short helical coils of wire that allow limited pivotal movement between the strips but prevent relative rotation. Although in the preferred embodiment the forward strip is arranged with its first end portion toward the rudder to estabilsh the remaining pattern of strips with like end portions joined, the forward strip may be arranged with its second end portion forward. In this manner, when like end portions of the remaining strips are joined, the overall pattern of the lure will be reversed.

The compound bends of the strips, that is, the dihedrally related end portions of the strips meeting along apex lines at an angle with respect to the transverse centerlines of the strips produce a unique action when joined with the remaining strips. Motion of one strip will, of course, because of the split ring connectors, affect the motion of the remaining strips and thus the overall lure. The extent of this motion is illustrated schematically by the phantom lines in FIG. 1. As can be readily seen in FIG. 1, when joined the first end portion 26 of the forward strip 24 and the first end portions 34 and 38 of the intermediate and rear strips 30 and 36 are generally parallel and the second end portions 28, 32, and 40 are also generally parallel. As the lure is pulled through the water the compound motion thus produced by the dihedrally related end portions acting on the water is one of rotation or rolling, the speed of which will vary with the trolling speed, and a wiggling motion particularly at the intermediate and rear strips 30 and 36. Since contrasting colors are used on the opposite sides of the strips, the rotational motion produced also creates an illusion of a conical solid body rapidly changing colors and thus closely simulates an actual fish.

An important feature is that the dihedrally related end portions, in addition to producing the desired motion, are inexpensive to manufacture since they each require only a single bend.

Each strip has a corner of its first and second end portions removed as shown, for example, at 50 and 52, respectively, on the forward strip 24 of FIG. 2. The removal of these corners reduces interference between adjoining strips as they are pulled through the water. The split ring connectors are inserted through openings or eyes 54 and 56 at the remaining corners of the end portions, again shown, for example, in the forward strip 24 in FIG. 2. As is readily seen the eyes are offset from the longitudinal center of the strip to increase the rotation of the lure and to reduce interference between adjoining strips.

It is necessary, of course, to isolate the rotational movement of the lure 10 from the fishing line 16 and to a lesser degree from the leader 20. For this purpose, a forward split ring connector 60 is joined to the first end portion 26 of the forward strip 24 and to the forward swivel 11. In like manner, a rear split ring connector 64 is joined to the second end portion 40 of the rear strip 36 and to the rear swivel 18. The forward swivel 11 is generally designed to be quite freely pivotable. The rear swivel 18 need not be as freely pivotable. It is preferable, although not necessary, that the leader and bait attached to the hook 22 rotate somewhat with the lure 10.

To assure that the rotation of the lure 10 does not pass through the forward swivel 11 and into the line 16 the rudder 12 is provided. As best shown in FIGS. 3 and 4, the rudder includes a flat central portion 66 integrally joined to two identical laterally extending channel or preferably V-shaped side portions 68. The rudder is generally rectangular in shape with the flat central portion being defined by a pair of first parallel fold lines 70 (FIG. 4). The V-shaped side portions are comprised of two inclined intermediate portions 72 defined by the first pair of parallel full lines 70 and a second parallel pair of full lines 74 which form the apexes of the V-shaped side portions. Finally, the V-shaped side portions include two inclined end portions 76 defined by the second pair of parallel fold lines 74 and the outer edges of the plate. The V-shaped portions suitably prevent the rudder from rotating as it is pulled through the water and cause it to move in a horizontal plane. A pair of openings 76 are provided at either end, designated as a front end 77 and a rear end 78, of the flat central portion for securing the swivel and the line to the rudder.

As is best seen in FIGS. 5 and 6, the lure may be folded into a compact package for enhancing its marketability. Preferably this is done by folding the intermediate strip 30 into the rear strip 36 and then folding the forward strip 24 into and against the intermediate strip. The folded strips are then placed across the apexes 74 of the V-shaped portions 68 of the rudder 12 and the assemblage may be inserted into a cellophane wrap or the like. Thus it forms a compact package that occupies a minimum of space in the fisherman's tackle box.

While particular forms of the invention have been shown and described, it is to be understood that further changes may be made in the construction and arrangements of the various parts without departing from the sphere and scope of the invention.

What is claimed is:
1. A trolling lure assembly comprising:
   a series of three elongated sheet material members, each member including dihedrally related first and second generally planar end portions meeting along an apex line which extends diagonally across said member, and an eye formed in each end portion of each said member near one corner of the free end thereof, with the eye in the first end portion being on the opposite side of the longitudinal center of said member from the eye in the second portion;
   roll motion transferring ring connector means connecting said members together in an end-to-end series relationship, said ring connector means extending through adjacent eyes of adjoining members;
   a swivel connector at the forward end of said lure connected to the corner eye at the forward end of the forward member;
   a leader line connected to the corner eye at the rear end of the rear member; and
   a hook on said leader rearwardly of said rear member.
2. The trolling lure assembly defined by claim 1, wherein the first end portion of each member is shorter than its second end portion, and wherein the roll motion transferring connector means connect together like end portions of adjoining members.
3. The trolling lure assembly defined by claim 1, comprising a forward, an intermediate and a rear member, wherein the first end portion of each member is shorter than its second end portion, and wherein the roll motion transferring connector means connect together like end portions of adjoining members.
4. The trolling lure assembly defined by claim 2, wherein the shorter first end portion of each member is approximately one-half the length of the longer second end portion of the member.
5. The trolling lure assembly defined by claim 1, in combination with a rudder located forwardly of and secured to said forward swivel connector.
6. The trolling lure assembly defined by claim 5, wherein said rudder has a flat central portion interconnected between two like side portions, each having a generally V-shaped cross-sectional form.

7. The trolling lure assembly defined by claim 1, wherein the opposite sides of said member are of contrasting colors.

8. The trolling lure assembly defined by claim 1, wherein each free end of each member is diagonally cut and slopes from adjacent the eye at such end laterally outwardly and longitudinally inwardly of the member.

9. A trolling lure assembly comprising:
- a rudder having forward end means connectable to the rear end of a trolling line;
- a series of three elongated sheet material attraction members, each member including dihedrally related first and second generally planar end portions meeting along an apex line which extends across said member, and an eye formed in each end portion of each said member, near the free end thereof;
- roll motion transferring connector means connecting said member together in an end-to-end series relationship said connector means extending through adjacent eyes of adjoining members;
- a swivel connector interconnected between the forward eye of the forward member and a rear portion of said rudder;
- hook means located rearwardly of the rear member; and
- connector means interconnected between the rear eye of said rear member and said hook means.

References Cited

UNITED STATES PATENTS

| | | | |
|---|---|---|---|
| 1,598,958 | 9/1926 | Crosby | 43—42.5 X |
| 1,802,295 | 4/1931 | Wear | 43—43.13 |
| 2,037,310 | 4/1936 | Bryan | 43—42.09 |
| 2,588,720 | 3/1952 | Heiland | 43—42.5 |
| 2,805,512 | 9/1957 | Bunce | 43—42.18 |

FOREIGN PATENTS 151,682  11/1937  Austria.

SAMUEL KOREN, Primary Examiner

DANIEL J. LEACH, Assistant Examiner

U.S. Cl. X.R.

43—42.5, 42.18, 43.13